United States Patent
Kimura (10) Patent No.: US 8,954,250 B2
(45) Date of Patent: Feb. 10, 2015

(54) VEHICULAR CONTROL APPARATUS AND VEHICULAR CONTROL METHOD

(71) Applicant: Kenji Kimura, Toyota (JP)

(72) Inventor: Kenji Kimura, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/673,416

(22) Filed: Nov. 9, 2012

(65) Prior Publication Data

US 2013/0131945 A1 May 23, 2013

(30) Foreign Application Priority Data

Nov. 21, 2011 (JP) .................................. 2011-254104

(51) Int. Cl.
| | |
|---|---|
| G08G 1/16 | (2006.01) |
| B60T 7/22 | (2006.01) |
| B60T 8/175 | (2006.01) |
| B60K 31/00 | (2006.01) |
| B60W 10/06 | (2006.01) |
| B60W 10/184 | (2012.01) |

(52) U.S. Cl.
CPC . *G08G 1/166* (2013.01); *B60T 7/22* (2013.01); *B60T 8/175* (2013.01); *B60K 31/0008* (2013.01); *B60W 10/06* (2013.01); *B60W 10/184* (2013.01); *G08G 1/16* (2013.01); *B60T 2201/022* (2013.01); *B60K 2310/28* (2013.01); *B60W 2540/10* (2013.01); *B60W 2710/105* (2013.01)
USPC ................................ 701/70; 701/96; 701/301

(58) Field of Classification Search
USPC .................. 701/70, 78, 80, 83, 93, 300, 301; 340/425.5, 901–905; 180/170, 174, 180/179; 303/3
See application file for complete search history.

(56) References Cited

U.S. PATENT DOCUMENTS

| | | | | |
|---|---|---|---|---|
| 5,410,484 | A * | 4/1995 | Kunimi et al. .................. 701/70 |
| 6,282,483 | B1 * | 8/2001 | Yano et al. ....................... 701/96 |
| 6,292,753 | B1 * | 9/2001 | Sugimoto et al. .............. 701/301 |
| 6,460,645 | B1 * | 10/2002 | Asada et al. ................... 180/179 |
| 8,396,639 | B2 * | 3/2013 | Nagata et al. ................... 701/70 |
| 2006/0116807 | A1 * | 6/2006 | Hijikata .......................... 701/96 |
| 2006/0220908 | A1 * | 10/2006 | Petersen et al. .............. 340/903 |
| 2007/0106475 | A1 * | 5/2007 | Kondoh ........................ 701/301 |
| 2007/0219695 | A1 * | 9/2007 | Chiu et al. ...................... 701/51 |
| 2007/0276577 | A1 * | 11/2007 | Kuge et al. ...................... 701/96 |
| 2008/0060613 | A1 * | 3/2008 | Bauerle et al. ................. 123/399 |
| 2009/0125237 | A1 * | 5/2009 | Kitagawa et al. ............. 701/301 |
| 2009/0128318 | A1 * | 5/2009 | Nagata et al. ................. 340/467 |
| 2009/0177359 | A1 * | 7/2009 | Ihara et al. ...................... 701/45 |
| 2011/0082623 | A1 * | 4/2011 | Lu et al. .......................... 701/41 |
| 2013/0024075 | A1 * | 1/2013 | Zagorski et al. ................ 701/46 |
| 2013/0054128 | A1 * | 2/2013 | Moshchuk et al. ........... 701/301 |

FOREIGN PATENT DOCUMENTS

| | | |
|---|---|---|
| JP | 01-149538 U | 10/1989 |
| JP | 05-256170 A | 10/1993 |
| JP | 2000-255352 A | 9/2000 |

* cited by examiner

*Primary Examiner* — Thomas Tarcza
*Assistant Examiner* — Tyler J Lee
(74) *Attorney, Agent, or Firm* — Gifford, Krass, Sprinkle, Anderson & Citkowski, P.C.

(57) ABSTRACT

An electronic control unit performs driving force reduction control to reduce the driving force of a driving wheel of the vehicle. Then, if an accelerator pedal is operated after the lapse of a predetermined time since detection of an obstacle that may collide with a vehicle, the electronic control unit brakes the driving wheel as driving force reduction control.

14 Claims, 4 Drawing Sheets

F I G . 1

1: ELECTRONIC CONTROL UNIT
2: ACCELERATOR PEDAL
40: DRIVING WHEEL

VEHICULAR CONTROL APPARATUS AND VEHICULAR CONTROL METHOD

INCORPORATION BY REFERENCE

The disclosure of Japanese Patent Application No. 2011-254104 filed on Nov. 21, 2011 including the specification, drawings and abstract is incorporated herein by reference in its entirety.

BACKGROUND OF THE INVENTION

1. Field of the Invention

The invention relates to a vehicular control apparatus and a vehicular control method.

2. Description of the Related Art

In the related art, there is known a vehicular control apparatus. When an accelerator pedal is operated by a predetermined amount or more, the vehicular control apparatus determines that the accelerator pedal has been erroneously operated. Then, the vehicular control apparatus reduces the output of an engine below an output corresponding to an operation amount of the accelerator pedal. Thus, the vehicular control apparatus reduces the driving force of driving wheels (e.g., Japanese Patent Application Publication No. 5-256170 (JP-5-256170 A) and the like).

When a vehicle travels over a projection in an ultralow speed range or when a large acceleration force is required, etc., a driver of the vehicle may intentionally step on the accelerator pedal in an excessive manner. On the other hand, an apparatus of the related art, which makes a determination on an erroneous operation of the accelerator pedal on the basis of the operation amount of the accelerator pedal, erroneously determines that such an excessive operation of the accelerator pedal based on the intention of the driver is an erroneous operation of the accelerator pedal, and reduces the driving force. Accordingly, a driving force corresponding to the intention of the driver cannot be obtained, and driveability may be adversely affected.

SUMMARY OF THE INVENTION

The invention provides a vehicular control apparatus and a vehicular control method that are capable of restraining driveability from deteriorating due to a decrease in driving force, by making an appropriate determination on the operation of an accelerator.

A vehicular control apparatus according to a first aspect of the invention is a vehicular control apparatus that performs driving force reduction control to reduce a driving force of a driving wheel of a vehicle. This vehicular control apparatus is equipped with a controller that determines whether or not the driving force reduction control needs to be performed, on the basis of a time from detection of an obstacle that may collide with the vehicle by the controller, to an operation of an accelerator of the vehicle. According to the first aspect of the invention, an appropriate determination is made on the operation of the accelerator. Therefore, driveability can be restrained from deteriorating due to a decrease in driving force.

A vehicular control apparatus of a second aspect of the invention is equipped with a controller that performs driving force reduction control to reduce a driving force of a driving wheel of a vehicle, if a brake of the vehicle is not operated before the lapse of a first predetermined time since detection of an obstacle that may collide with the vehicle by the controller, and an accelerator of the vehicle is operated after the lapse of the first predetermined time since detection of the obstacle that may collide with the vehicle. Accordingly, it can be appropriately determined whether or not the accelerator is operated due to the driver's hesitation.

A vehicular control method of a third aspect of the invention is a vehicular control method for performing driving force reduction control to reduce a driving force of a driving wheel of a vehicle. In this vehicular control method, it is determined whether or not the driving force reduction control needs to be performed, on the basis of a time from detection of an obstacle that may collide with the vehicle, to an operation of an accelerator of the vehicle. Accordingly, an appropriate determination is made on the operation of the accelerator. Therefore, driveability can be restrained from deteriorating due to a decrease in driving force.

In a vehicular control method of a fourth aspect of the invention, driving force reduction control is performed to reduce a driving force of a driving wheel of a vehicle if a brake of the vehicle is not operated before the lapse of a first predetermined time since detection of an obstacle that may collide with the vehicle, and an accelerator of the vehicle is operated after the lapse of the first predetermined time since detection of the obstacle that may collide with the vehicle.

Accordingly, it can be appropriately determined whether or not the accelerator is operated due to the driver's hesitation.

BRIEF DESCRIPTION OF THE DRAWINGS

The features, advantages, and technical and industrial significance of this invention will be described in the following detailed description of an example embodiment of the invention with reference to the accompanying drawings, in which like numerals denote like elements, and wherein.

DETAILED DESCRIPTION OF EMBODIMENT

One embodiment of the invention as a concrete form of a vehicular control apparatus of the invention will be described hereinafter with reference to FIGS. 1 to 4. Incidentally, the control apparatus of this embodiment of the invention is applied to a vehicle that is configured to obtain a driving force from an output of an engine 6 as a prime mover.

Figure 1:
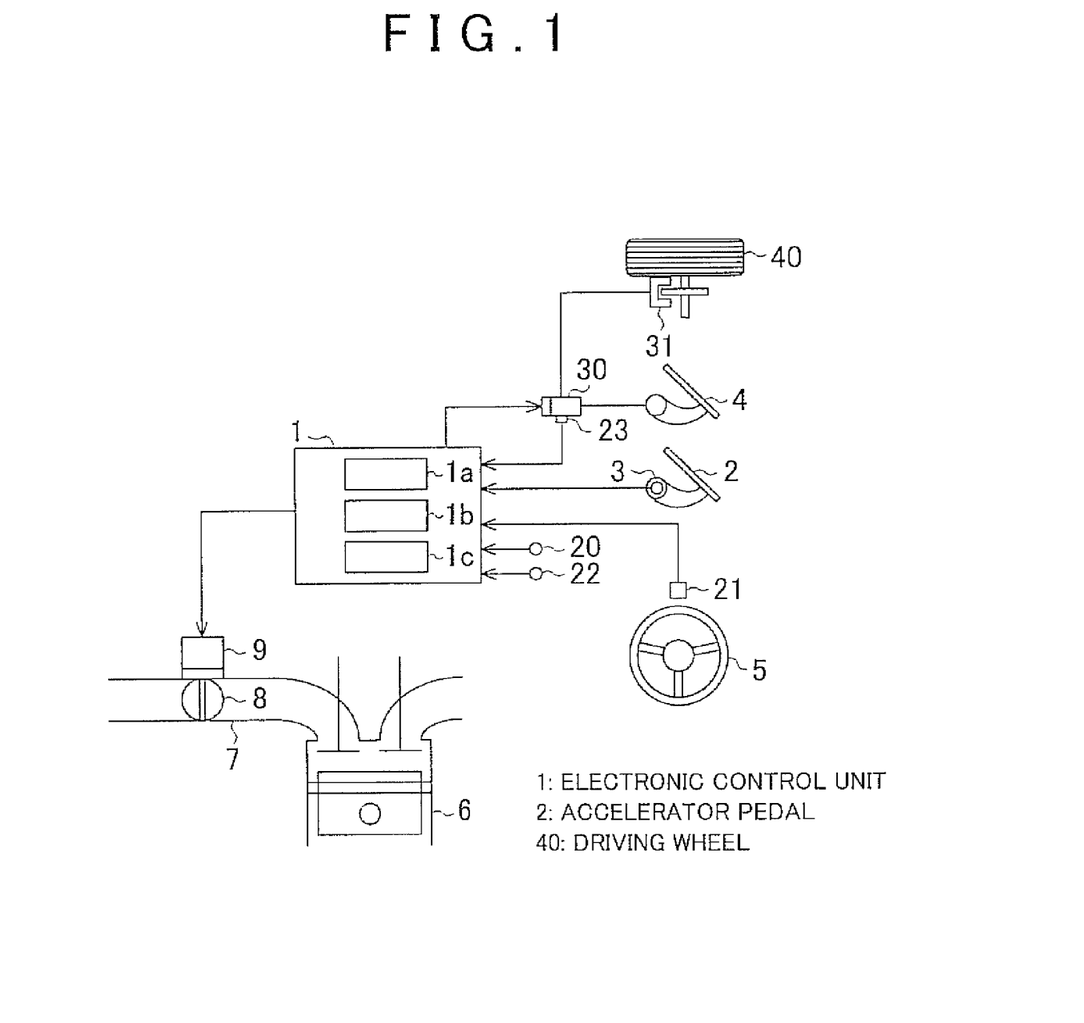
FIG. 1 is a schematic view showing an overall configuration of a vehicle in one embodiment of the invention.

As shown in FIG. 1, the vehicular control apparatus of this embodiment of the invention is mainly constituted by an in-vehicle electronic control unit 1. The electronic control unit 1 is equipped with a central processing unit (a CPU) 1a that performs various kinds of calculation processing regarding vehicular control, a read only memory (a ROM) 1b in which programs and data for control are stored, and a random access memory (a RAM) 1c in which a calculation result of the CPU 1a and detection results of sensors are temporarily stored.

Sensors and switches that are provided at respective portions of the vehicle, for example, an accelerator pedal sensor 3, a vehicle speed sensor 20, a steering wheel angle sensor 21, and the like are connected to this electronic control unit 1. It should be noted herein that the accelerator pedal sensor 3 detects an accelerator operation amount ACCP as a depression amount of an accelerator pedal 2. The vehicle speed sensor 20 detects a speed of the vehicle (a vehicle speed V). The steering angle sensor 21 detects a steering angle as a rotational angle of a steering wheel 5. Incidentally, the electronic control unit 1 calculates a steering angle θ of steerable wheels of the vehicle, on the basis of the steering wheel angle and a steering gear ratio in a steering device. Besides, a radar 22 and a pressure sensor 23 are also connected to the electronic control unit 1. The radar 22 detects an obstacle in a vehicle traveling direction of the vehicle. The pressure sensor 23 detects a brake hydraulic pressure BP in a master cylinder 30 to which a brake pedal 4 is connected. Incidentally, an operation amount of the brake pedal 4 is detected on the basis of the brake hydraulic pressure BP.

Actuators that are provided at respective portions of the vehicle, for example, a throttle motor 9, an actuator and the like are connected to the electronic control unit 1. The throttle motor 9 is provided on an intake passage 7 of an engine 6. In addition, the throttle motor 9 drives a throttle valve 8 for adjusting the output of the engine. The actuator is provided on the aforementioned master cylinder 30. In addition, the actuator controls a brake 31 of a driving wheel 40.

In this vehicle, the electronic control unit 1 determines driving circumstances of the vehicle from detection results of the respective sensors and the respective switches. The electronic control unit 1 then outputs command signals to the respective actuators in accordance with the determined driving circumstances of the vehicle, thereby controlling the vehicle. For example, the electronic control unit 1 controls the opening degree of the throttle valve 8 in accordance with the accelerator operation amount ACCP. Thus, the electronic control unit 1 adjusts the driving force output from the engine 6. Besides, the electronic control unit 1 controls the actuator provided on the master cylinder 30. Thus, the electronic control unit 1 adjusts the braking force applied to the driving wheel 40.

In the meantime, as described above, a driver of the vehicle usually performs a brake operation upon recognizing an obstacle approaching to the vehicle or a travelling path of the vehicle. On the other hand, when the driver erroneously performs an accelerator operation instead of a brake operation, there is a feature in the timing of the accelerator operation.

That is, the driver of the vehicle usually performs a brake operation after recognizing the approach of an obstacle in the vehicle traveling direction. However, when an accelerator operation is performed after a period in which the brake operation ought to be performed, the driver has performed an erroneous operation after missing the timing due to hesitation, etc. In this case, it can be determined that the accelerator operation is not based on the intention of the driver.

Besides, when an accelerator operation is performed before the period in which the brake operation ought to be performed, the driver has performed an erroneous operation out of impatience. It can be determined that this operation is not an accelerator operation based on the intention of the driver either.

In this manner, it can be appropriately determined whether an accelerator operation results from the intention of the driver or is an erroneous operation, on the basis of the time from detection of the approach of an obstacle in the vehicle traveling direction to the operation of the accelerator, instead of the operation amount of the accelerator.

Figure 2:
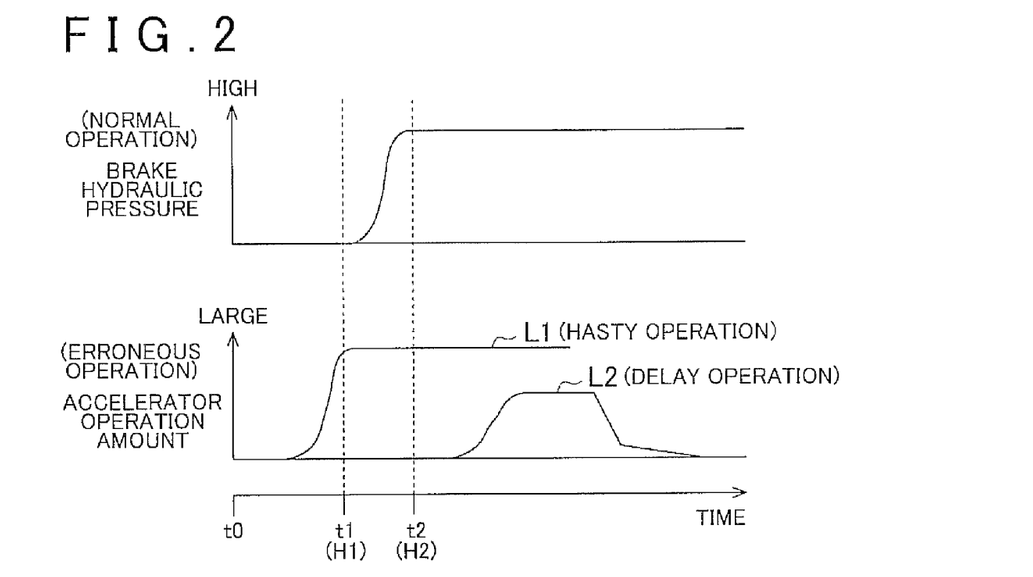
FIG. 2 includes timing charts showing types of an erroneous operation of an accelerator.

FIG. 2 shows an example of an experimental result. As shown in this FIG. 2, upon recognizing the approach of an obstacle in the vehicle traveling direction at a time point t0, the driver usually performs an operation of shifting depression from the accelerator pedal 2 to the brake pedal 4. After that, an operation of the brake pedal 4 is started at a time point t1. After that, the depression of the brake pedal 4 is completed at a time point t2, so that the brake operation is completed.

On the other hand, when the driver of the vehicle erroneously operates the accelerator pedal 2 subsequently to untimely operation, after recognizing the approach of an obstacle in the vehicle traveling direction, the accelerator operation tends to be performed after a period in which the brake operation ought to be performed (from the time point t1 to the time point t2), as indicated by a line L2. This delay in the erroneous operation of the accelerator will be referred to hereinafter as "a delay operation". Incidentally, during this delay operation, the driver hesitates about pedal operation. Thus, it has also been observed that the operation amount of the accelerator pedal 2 tends to be small.

On the other hand, when the driver of the vehicle erroneously depresses the accelerator pedal 2 out of impatience after recognizing the approach of an obstacle in the vehicle traveling direction, the accelerator operation tends to be performed before the period in which the brake operation ought to be performed (from the time point t1 to the time point t2), as indicated by a line L1. This premature erroneous operation of the accelerator will be referred to hereinafter as "a hasty operation".

In this manner, it can be determined whether the accelerator operation results from the intention of the driver or is an erroneous operation, on the basis of the time from detection of the approach of an obstacle in the vehicle traveling direction to the operation of the accelerator pedal 2, instead of the operation amount of the accelerator. Thus, in this embodiment of the invention, an erroneous operation of the accelerator pedal 2 is detected on the basis of this principle. Then, when an erroneous operation of the accelerator pedal 2 is detected after the approach of an obstacle in the vehicle traveling direction is detected, driving force reduction control is performed to reduce the driving force of the driving wheel 40.

Figure 3:
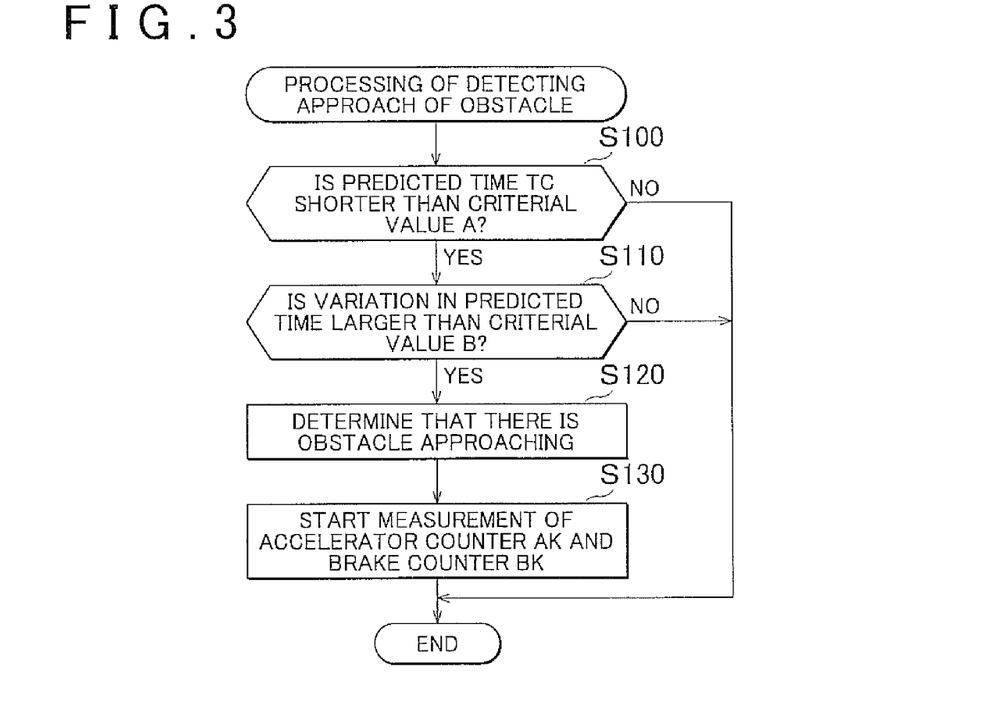
FIG. 3 is a flowchart showing a procedure of a processing of detecting the approach of an obstacle in the embodiment of the invention.

First of all, referring to FIG. 3, a processing performed by the electronic control unit 1 to detect the approach of an obstacle to the vehicle will be described. Incidentally, the present processing is repeatedly performed on a predetermined cycle by the electronic control unit 1. When the present processing is started, it is first determined whether or not a predicted time TC is shorter than a criterial value A (S100). This predicted time TC is a predicted time to a collision of the vehicle with the obstacle. In addition, this predicted time is calculated on the basis of detection signals of the vehicle speed sensor 20 and the radar 22. More specifically, the predicted time TC is calculated by dividing "a distance between the host vehicle and the obstacle in the vehicle traveling direction" by "a relative speed between the host vehicle and the obstacle in the vehicle traveling direction".

Then, if the predicted time TC is equal to or longer than the criterial value A (S100: NO), it is determined that there is no possibility of a collision of the present vehicle, and the present processing is temporarily ended. On the other hand, if the predicted time TC is shorter than the criterial value A (S100: YES), it is determined whether or not a variation TCH in the predicted time TC is larger than a criterial value B (S110). This variation TCH is an amount of change in the predicted time TC within a predetermined period. In addition, the value of the variation TCH increases as the predicted time TC changes in a shortening direction, namely, as the possibility of a collision with the obstacle increases.

Then, if the variation TCH is smaller than the criterial value B (S110: NO), the present processing is temporarily ended. On the other hand, if the variation TCH is larger than the criterial value B (S110: YES), it is determined that the obstacle is approaching too close in the traveling direction of the vehicle (S120).

If the electronic control unit 1 thus determines that the obstacle is approaching too close to the vehicle, the measurement of an accelerator counter AK and a brake counter BK is started (S130), and the present processing is temporarily ended. The value of this accelerator counter AK is measured as a value indicating a time from the determination in step S120 that the obstacle is approaching to the start of the operation of the accelerator pedal 2. Besides, the value of the brake counter BK is measured as a value indicating a time from the determination in step S120 that the obstacle is approaching to the start of the operation of the brake pedal 4.

Next, the procedure of the driving force reduction processing will be described with reference to FIG. 4. Incidentally, the present processing is also repeatedly performed on a predetermined cycle by the electronic control unit 1. When the present processing is started, it is first determined whether or not the approach of an obstacle has been detected (S200). In this step S200, a positive determination is made when the aforementioned process of step S120 in FIG. 3 is performed. That is, it is determined whether or not it is determined that there is an obstacle approaching. Then, if it is determined that there is an obstacle approaching, a positive determination is made in step S200. Then, if the approach of an obstacle has not been detected (S200: NO), the present processing is temporarily ended.

On the other hand, if the approach of an obstacle has been detected (S200: YES), it is determined whether or not the current steering angle θ is an angle smaller than a criteria, value C (S210). Then, if the steering angle θ is an angle equal to or larger than the criterial value C (S210: NO), there is a possibility of the driver attempting to avoid the obstacle through steering. Thus, driving force reduction control is not performed, and the present processing is temporarily ended.

On the other hand, if the steering angle θ is an angle smaller than the criterial value C (S210: YES), it is determined whether or not the value of the aforementioned accelerator counter AK is smaller than a first criterial value H1 (S220). This first criterial value H1 is a value equivalent to a time from recognition of the obstacle approaching to the vehicle or to a traveling path of the vehicle by the driver of the vehicle to the start of a brake operation. In addition, the first criterial value H1 is set to an appropriate value through a preliminary experiment or the like. Incidentally, this first criterial value H1 is a value equivalent to the time from the time point t0 to the time point t1 as shown above in FIG. 2.

Then, if the value of the accelerator counter AK is smaller than the first criterial value H1 (S220: YES), output restraint control as a kind of driving force reduction control is performed (S230), and the present processing is temporarily ended. In this output restraint control, the engine output of the engine 6 is reduced below an output corresponding to the accelerator operation amount ACCP. Due to this restraint of the engine output, the driving force of the driving wheel 40 is reduced.

On the other hand, if the value of the accelerator counter AK is larger than the first criterial value H1 (S220: NO), the process of step S240 is carried out. In this step S240, it is determined whether or not the value of the aforementioned brake counter BK is larger than a second criterial value H2, and whether or not the value of the accelerator counter AK is larger than the second criterial value H2 (S240). This second criterial value H2 is a value equivalent to a time from recognition of an obstacle approaching to the vehicle or to a travelling path of the vehicle by the driver of the vehicle to the completion of a brake operation. In addition, the second criterial value H2 is set to an appropriate value through a preliminary experiment or the like. Incidentally, this second criterial value H2 is a value equivalent to the time from the time point t0 to the time point t2 shown above in FIG. 2. In addition, the second criterial value H2 is a value larger than the first criterial value H1.

Then, if a negative determination is made in step S240, the present processing is temporarily ended. On the other hand, if a positive determination is made in step S240, brake control as a kind of driving force reduction control is performed (S250), and the present processing is temporarily ended. In this brake control, the brake 31 is controlled to brake the driving wheel 40, so that the driving force of the driving wheel 40 is reduced.

Next, the operation of this embodiment of the invention will be described. As described above, According to the invention, it can be appropriately determined whether an accelerator operation results from the intention of the driver or is an erroneous operation, on the basis of the time from detection of an obstacle approaching to the vehicle or to a travelling path of the vehicle to the accelerator operation, instead of the accelerator Operation amount. The obstacle approaching to the vehicle or the travelling path of the vehicle may be regarded as an obstacle that may collide with the vehicle.

Thus, it is determined whether or not the driving force reduction processing needs to be performed, on the basis of the time from detection of the obstacle approaching to the vehicle to the operation of the accelerator pedal 2. Accordingly, even in the case where the accelerator operation amount is large, if the timing of the accelerator operation is not a timing of an erroneous operation, it is determined that the accelerator operation results from the intention of the driver, and driving force reduction control is not performed. Thus, a driving force corresponding to the intention of the driver is obtained, and driveability is restrained from deteriorating.

On the contrary, even in the case where the accelerator operation amount is small, if the timing of the accelerator operation is a timing of an erroneous operation, it is determined that the accelerator operation is an erroneous operation of the accelerator that does not result from the intention of the driver, and driving force reduction control is performed. Thus, driving force reduction control is appropriately performed when the accelerator is erroneously operated. Incidentally, as described above, the accelerator operation amount may become smaller during "delay operation" than during "hasty operation". In making a determination on an erroneous operation of the accelerator on the basis of a conventional operation amount, an erroneous operation cannot be detected when the accelerator operation amount is small. On the other hand, in this embodiment of the invention, a determination on an erroneous operation of the accelerator is made on the basis of the operation timing of the accelerator pedal 2 instead of the operation amount. Therefore, an erroneous operation can be detected when the accelerator operation amount is small as well.

Besides, if the value of the brake counter BK is larger than the second criterial value H2 and the value of the accelerator counter AK is larger than the second criterial value H2 (step S240: YES) after the obstacle approaching to the vehicle is detected (step S200 of FIG. 4: YES), brake control is performed (step S250).

That is, if the brake pedal 4 is not operated, namely, there is a delay in brake operation before the lapse of the time equivalent to the second criterial value H2 since detection of the obstacle approaching to the vehicle, and the accelerator pedal 2 is operated after the lapse of the time equivalent to the second criterial value H2 since detection of the obstacle to the vehicle, the driving wheel 40 is braked. Thus, it is determined that the accelerator operation performed after detection of the obstacle approaching to the vehicle is an erroneous operation of the accelerator pedal 2 resulting from the driver's untimely operation (the aforementioned "delay operation"). In addition, when it is thus determined that an erroneous operation is performed, it is desirable to swiftly reduce the driving force, in consideration of the fact that a certain time, namely, at least the time equivalent to the second criterial value H2 has elapsed since detection of the obstacle approaching to the vehicle, and that the brake pedal 4 is not operated. Thus, the driving wheel 40 is braked as driving force reduction control, so that an appropriate distance is ensured between the vehicle and the obstacle approaching to the vehicle.

Besides, if the value of the accelerator counter AK is smaller than the first criterial value H1 (step S220: YES) after detection of the obstacle approaching to the vehicle (step S200 of FIG. 4: YES), output restraint control is performed (step S230).

That is, if the accelerator pedal 2 is operated before the lapse of a time equivalent to the first criterial value H1, namely, another criterial time earlier than the aforementioned second criterial value since detection of the obstacle approaching to the vehicle, the engine output is restricted. Thus, it is determined that the accelerator operation performed after detection of the obstacle approaching to the vehicle is an erroneous operation of the accelerator pedal 2 resulting from the driver's impatience for operation (the aforementioned "hasty operation"). In addition, in this case, the output of the engine 6 is restrained as driving force reduction control. Thus, an appropriate distance is ensured between the vehicle and the obstacle approaching to the vehicle.

As described above, according to this embodiment of the invention, the following effects needs to be obtained. That is, it is determined whether or not driving force reduction control can be performed, on the basis of the time from detection of the obstacle approaching to the vehicle to the operation of the accelerator pedal 2. Accordingly, an appropriate determination is made on the operation of the accelerator pedal 2, so that driveability can be restrained from deteriorating due to a decrease in driving force.

Besides, if the brake of the vehicle is not operated before the lapse of the predetermined first criterial time since detection of the obstacle approaching to the vehicle by the controller, and the accelerator of the vehicle is operated after the lapse of the first criterial time since detection of the obstacle approaching to the vehicle by the controller, driving force reduction control is performed to reduce the driving force of the driving wheel. That is, it is determined whether or not the brake pedal 4 remains unoperated before the lapse of the time equivalent to the second criterial value H2 since detection of the obstacle approaching to the vehicle and the accelerator pedal 2 is operated after the lapse of the time equivalent to the second criterial value H2 since detection of the obstacle approaching to the vehicle. Accordingly, it is determined whether or not an acceleration operation is performed as a result of the driver's hesitation (the aforementioned "delay operation"). Then, if it is determined that the aforementioned "delay operation" is performed, it is desirable to swiftly reduce the driving force in consideration of the fact that a certain time has elapsed since detection of the obstacle approaching to the vehicle and that the brake is not operated. Accordingly, the driving wheel 40 is braked as driving force reduction control. Accordingly, an appropriate determination is made on the operation of the accelerator pedal 2, and driveability can be restrained from deteriorating due to a decrease in driving force. Furthermore, an appropriate distance can be ensured between the vehicle and the obstacle approaching to the vehicle.

Besides, if the accelerator is operated before the lapse of another criterial time that is earlier than the predetermined criterial time since detection of the obstacle approaching to the vehicle in the vehicle control apparatus, the engine output of the vehicle is restrained. Incidentally, the aforementioned another criterial time is desired to be set to a time from recognition of the obstacle approaching to the vehicle by the driver of the vehicle to the start of a brake operation. This criterial time can be appropriately set through an experiment or the like. That is, if the accelerator pedal 2 is operated before the lapse of the time equivalent to the first criterial value H1 since detection of the obstacle approaching to the vehicle (another criterial time earlier than the second criterial value H2), the engine output is restrained as driving force reduction control. Accordingly, it can be determined that the accelerator operation performed after detection of the obstacle approaching to the vehicle is an erroneous operation of the accelerator resulting from the driver's impatience for operation. In addition, in this case, an appropriate distance can be ensured between the vehicle and the obstacle approaching to the vehicle.

In this manner, as driving force reduction control, it is possible to adopt a configuration in which the driving wheels of the vehicle are braked, or a configuration in which the engine output of the vehicle is restrained.

Incidentally, the foregoing embodiment of the invention can also be carried out after being modified as follows. The process of step S210 shown above in FIG. 4, namely, the process of making a determination through a comparison between the steering angle θ and the criterial value C may be omitted.

Figure 4:
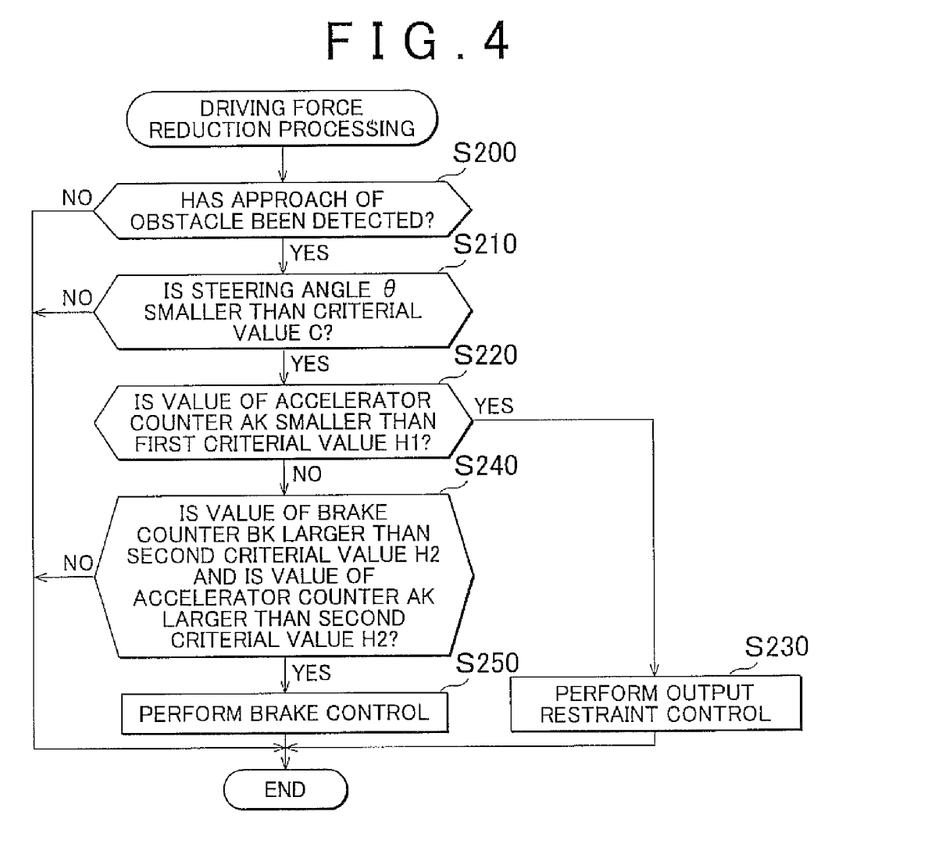
FIG. 4 is a flowchart showing a procedure of a driving force reduction processing in the embodiment of the invention.
Figure 5:
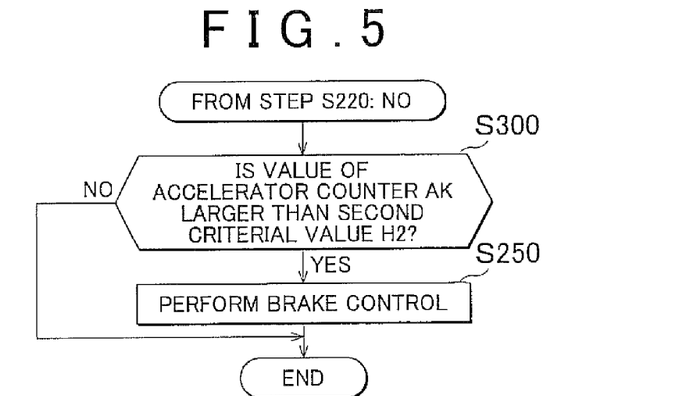
FIG. 5 is a flowchart showing part of a procedure of a driving force reduction processing in a modification example of the embodiment of the invention.

If a negative determination is made in step S220 of FIG. 4, a determination is made in step S240 through a comparison between the value of the brake counter BK and the value of the accelerator counter AK. Moreover, as shown in FIG. 5, if a negative determination is made in step S220 of FIG. 4, it is determined only whether or not the value of the accelerator counter AK is larger than the second criterial value H2 (step S300), instead of performing the process of step S240. Then, if the value of the accelerator counter AK is larger than the second criterial value H2 (S300: YES), it is determined that there is a state of the aforementioned "delay operation", and brake control may be performed subsequently in step S250.

This modification example can also determine that the accelerator operation performed after detection of an obstacle approaching to the vehicle is an erroneous operation of the accelerator pedal 2 resulting from the driver's untimely operation. Then, if the value of the accelerator counter AK is larger than the second criterial value H2, a certain time, namely, at least the time equivalent to the second criterial value H2 has elapsed since detection of the obstacle approaching to the vehicle. Therefore, it is desirable to swiftly reduce the driving force. Thus, in this modification example as well, the driving wheel 40 is braked as the driving force reduction processing. Accordingly, an appropriate distance is ensured between the vehicle and the obstacle approaching to the vehicle.

Figure 6:
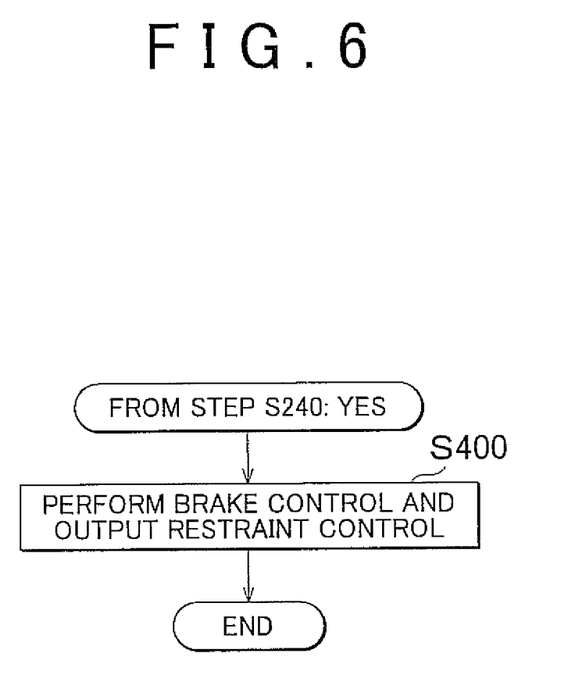
FIG. 6 is a flowchart showing part of a procedure of a driving force reduction processing in another modification example of the embodiment of the invention.

If a positive determination is made in step S240 of FIG. 4, brake control is performed in step S250. Moreover, if a positive determination is made in step S240 of FIG. 4, output restraint control for the engine 6 may be performed instead of brake control for the driving wheel 40, as driving force reduction control. Besides, as indicated by step S400 of FIG. 6, if a positive determination is made in step S240 of FIG. 4, output restraint control for the engine 6 may be performed in conjunction with brake control for the driving wheel 40, as driving force reduction control. In this case, when the driving wheel 40 is braked, the engine output is restrained as well. Therefore, the driving force of the driving wheel 40 can be further reduced. Thus, a more appropriate distance can be ensured, for example, between the vehicle and the obstacle approaching to the vehicle.

A determination on the approach of an obstacle is made on the basis of the aforementioned predicted time TC and the aforementioned variation TCH. However, a determination on the approach of an obstacle may be made according to other modes. For example, a video apparatus such as a camera or the like for monitoring the vehicle traveling direction is provided. Then, if the lighting of a brake lamp of a preceding vehicle is detected by the video apparatus and the distance to the preceding vehicle has rapidly become short, it may be determined that there is an obstacle approaching. Besides, if the blinking of a turn signal of a vehicle traveling on an adjacent lane is detected by the video apparatus and the abrupt intrusion of the vehicle into the lane on which the host vehicle is traveling is detected, it may be determined that there is an obstacle approaching. Besides, if the sudden appearance of a pedestrian, a bicycle or the like in the vehicle traveling direction is detected, it may be determined that there is an obstacle approaching.

As an example of the detection of the obstacle that may collide with the vehicle, the obstacle approaching to the vehicle is detected in the above-described embodiment. However, the detection of the obstacle approaching to the vehicle is regarded as (i) a detection of the obstacle approaching to a travelling path of the vehicle, or to an area in front of the vehicle, (ii) a detection of the obstacle, from which a distance to the vehicle is decreasing.

In the foregoing embodiment of the invention, the accelerator operation is performed through depression of the accelerator pedal 2. However, the accelerator operation may be performed through an operation other than depression of the pedal. Examples of the accelerator operation other than depression of the pedal include a manual operation such as paddle shift and, an acoustic operation, and the like. By the same token, the brake operation is performed through depression of the brake pedal 4. However, the brake operation may be performed through an operation other than depression of the pedal.

In the foregoing embodiment of the invention, the case where the driving force control apparatus in accordance with the invention is applied to the vehicle that is equipped with the engine 6 as a prime mover has been described. However, the invention is also applicable in a similar manner to an electric vehicle that is equipped with a motor as a prime mover, a hybrid vehicle that is equipped with a motor and an engine as prime movers, and the like.

While the disclosure has been explained in conjunction with the specific exemplary embodiment thereof, it is evident that many alternatives, modifications, and variations will be apparent to those skilled in the art. Accordingly, the exemplary embodiment of the disclosure as set forth herein is intended to be illustrative, not limiting. There are changes that may be made without departing from the scope of the disclosure.

What is claimed is:

1. A vehicular control apparatus that performs driving force reduction control to reduce a driving force of a driving wheel of a vehicle, the vehicular control apparatus comprising:
    an accelerator pedal sensor that detects operation of an accelerator pedal;
    an electronic control unit in communication with the accelerator pedal sensor, the electronic control unit determines whether or not the driving force reduction control needs to be performed, on a basis of a time from detection of an obstacle that may collide with the vehicle by the electronic control unit, to the detected operation of the accelerator pedal.

2. The vehicle control apparatus according to claim 1, wherein
    an obstacle that approaches the vehicle or an obstacle that approaches a travelling side of the vehicle is detected as the obstacle that may collide with the vehicle.

3. The vehicular control apparatus according to claim 1, wherein
    the electronic control unit brakes the driving wheel as the driving force reduction control.

4. The vehicular control apparatus according to claim 1, wherein
    the electronic control unit reduces an engine output of the vehicle as the driving force reduction control.

5. A vehicular control apparatus comprising:
    an accelerator pedal sensor that detects operation of an accelerator pedal;
    a brake pedal sensor that detects the operation of a brake pedal;
    an electronic control unit in communication with the accelerator pedal sensor and the brake pedal sensor, the electronic control unit performs a driving force reduction control to reduce a driving force of a driving wheel of a vehicle, when the brake pedal of the vehicle is not operated before a lapse of a first predetermined time from a detection of an obstacle that may collide with the vehicle by the electronic control unit, and the accelerator pedal of the vehicle is operated after the lapse of the first predetermined time from the detection of the obstacle that may collide with the vehicle.

6. The vehicle control apparatus according to claim 5, wherein an obstacle that approaches the vehicle or an obstacle that approaches a travelling path of the vehicle is detected as the obstacle which may collide with the vehicle.

7. The vehicular control apparatus according to claim 5, wherein
    the electronic control unit brakes the driving wheel as the driving force reduction control.

8. The vehicular control apparatus according to claim 5, wherein
    the electronic control unit reduces an engine output of the vehicle as the driving force reduction control.

9. The vehicular control apparatus according to claim 5, wherein
    the electronic control unit reduces an engine output of the vehicle, when the accelerator is operated before lapse of a second predetermined time that is earlier than the first predetermined time since detection of the obstacle that may collide with the vehicle.

10. A vehicular control method for performing driving force reduction control to reduce a driving force of a driving wheel of a vehicle, the vehicular control method, comprising:
  determining, by an electronic control unit, whether or not the driving force reduction control needs to be performed, on a basis of a time from detection of an obstacle that may collide with the vehicle, to an operation of an accelerator pedal of the vehicle; and
  performing a driving force reduction when the electronic control unit determines the reduction needs to be performed.

11. The vehicle control method according to claim 10, wherein
  an obstacle that approaches to the vehicle or an obstacle that approaches a travelling path of the vehicle is detected as the obstacle that may collide with the vehicle.

12. A vehicular control method comprising:
  performing a driving force reduction control to reduce a driving force of a driving wheel of a vehicle, when an electronic control unit determines a brake pedal of the vehicle is not operated before lapse of a first predetermined time since detection of an obstacle that may collide with the vehicle, and an accelerator pedal of the vehicle is operated after lapse of the first predetermined time since detection of the obstacle that may collide with the vehicle.

13. The vehicle control method according to claim 12, wherein
  an obstacle that approaches the vehicle or an obstacle that approaches a travelling path of the vehicle is detected as the obstacle that may collide with the vehicle.

14. The vehicle control apparatus of claim 1 wherein, the electronic control performs the driving force reduction control when the time from detection of the obstacle that may collide with the vehicle to the detected operation of the accelerator pedal is less than a first predetermined threshold, or when the time from detection of an obstacle that may collide with the vehicle by the electronic control unit to the detected operation of the accelerator pedal is greater than a second predetermined threshold.

* * * * *